(12) United States Patent
Andrzejewski et al.

(10) Patent No.: US 11,976,693 B2
(45) Date of Patent: May 7, 2024

(54) CLUTCH ASSEMBLY FOR COUPLING AND DECOUPLING CLUTCH MEMBERS

(71) Applicant: Means Industries, Inc., Saginaw, MI (US)

(72) Inventors: Todd M. Andrzejewski, Saginaw, MI (US); Joshua D. Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/839,267

(22) Filed: Jun. 13, 2022

(65) Prior Publication Data

US 2022/0397162 A1 Dec. 15, 2022

Related U.S. Application Data

(60) Provisional application No. 63/210,543, filed on Jun. 15, 2021.

(51) Int. Cl.
 *F16D 27/09* (2006.01)
 *F16D 11/14* (2006.01)
 *F16D 23/12* (2006.01)

(52) U.S. Cl.
 CPC .............. *F16D 27/09* (2013.01); *F16D 11/14* (2013.01); *F16D 2023/123* (2013.01)

(58) Field of Classification Search
 CPC ......... F16D 27/00–14; F16D 11/00–16; F16D 2023/123; F16D 41/00–22
 See application file for complete search history.

(56) References Cited

U.S. PATENT DOCUMENTS

| | | | |
|---|---|---|---|
| 4,244,455 A * | 1/1981 | Loker ................... | F16D 11/04 192/24 |
| 10,006,507 B2 * | 6/2018 | Lee ........................ | F16D 41/12 |
| 2004/0055850 A1 * | 3/2004 | Howard ................. | F16D 11/10 192/114 R |
| 2014/0305761 A1 * | 10/2014 | Kimes ................... | F16D 41/125 192/46 |
| 2015/0027843 A1 * | 1/2015 | Russalian .............. | F16D 27/10 192/71 |
| 2017/0343061 A1 * | 11/2017 | Campton ............... | F16D 41/16 |
| 2018/0023635 A1 * | 1/2018 | Neelakantan ......... | F16D 25/061 475/149 |

* cited by examiner

*Primary Examiner* — David R Morris
(74) *Attorney, Agent, or Firm* — Burgess Law Office, PLLC

(57) ABSTRACT

A clutch assembly, the assembly may include a first member having a locking structure and a second member having a receiving area. The assembly may include a locking element supported in the receiving area of the second member, the locking element moving between an engaged position where the locking element holds or transfers torque between the first and second members and a disengaged position where the locking element holds or transfers no torque between the first and second members. The locking element includes a socket. Moreover, the assembly may include a reciprocating member in the socket when the locking element is in the disengaged position.

20 Claims, 3 Drawing Sheets

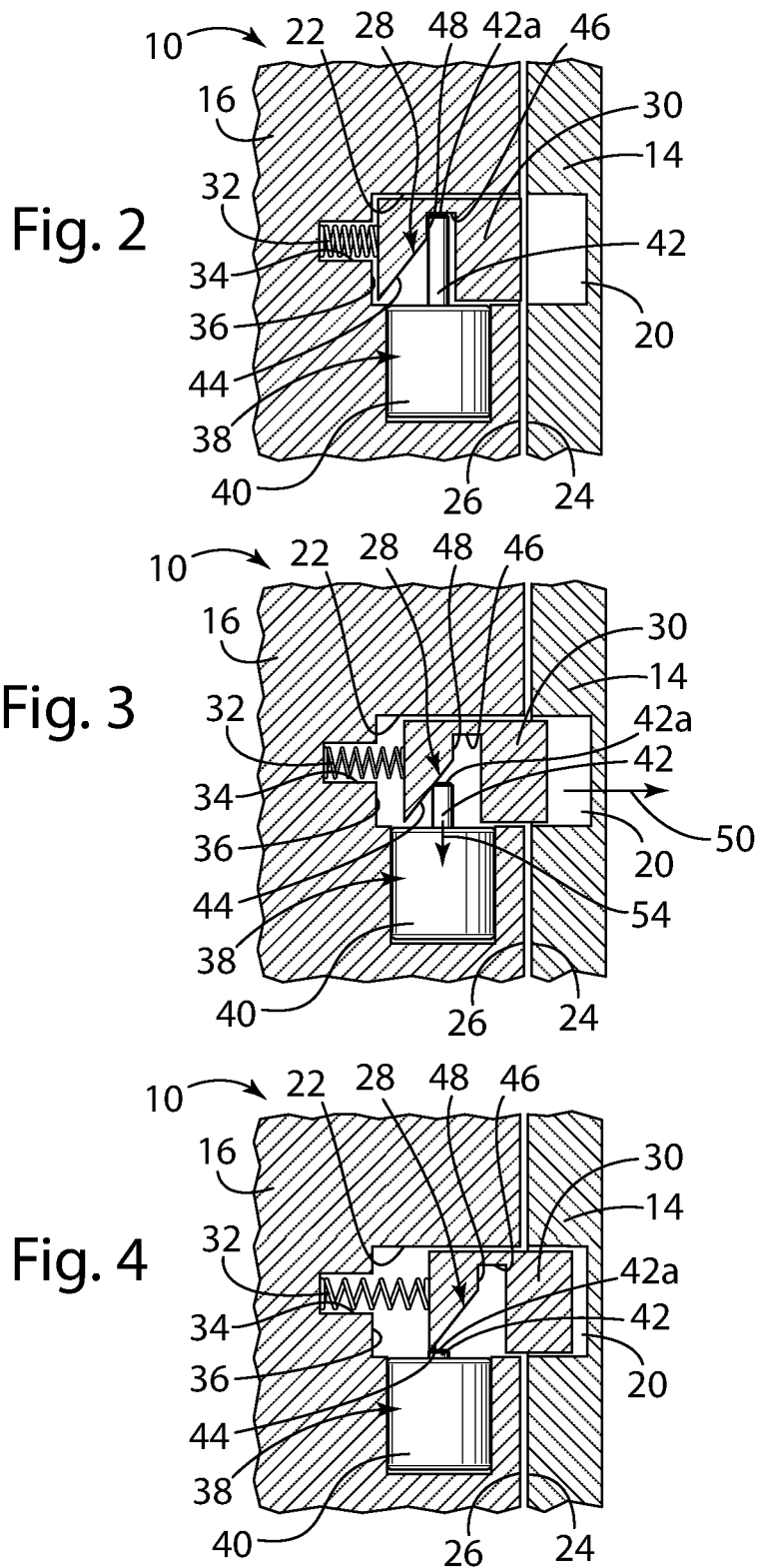

CLUTCH ASSEMBLY FOR COUPLING AND DECOUPLING CLUTCH MEMBERS

CROSS-REFERENCE TO RELATED APPLICATIONS

This application claims the benefit of U.S. Provisional Application No. 63/210,543, filed Jun. 15, 2021. The disclosure of the above application is incorporated herein by reference.

BACKGROUND OF THE INVENTION

1. Field of the Invention

The present invention generally relates to a clutch assembly; and, more specifically, to a clutch assembly including a locking element for coupling and decoupling clutch members.

2. Description of Related Art

A clutch assembly often includes first and second members and at least one locking element (e.g., a strut, a pawl, etc.). The locking element moves between a deployed position wherein the locking element extends from the first member and engages the second member and a non-deployed position wherein the locking element does not extend from the first member wherein the first and second members are disengaged from each other.

The locking element may not be rigidly connected to a stationary first member. Consequently, during shock load or "high G-load" events, the locking element can unintentionally deploy, extend from the first member, and engage the second coupling member. Unintended deployment of the locking element involves the locking element unintentionally moving from the non-deployed position to the deployed position. Unintended deployment of the locking element, i.e., the locking element unintentionally moving from the disengaged position to the engaged position due to shock load, can be a problem.

SUMMARY OF THE INVENTION

A clutch assembly having a first member with a locking structure and a second member with a receiving area. The assembly includes a locking element supported in the receiving area of the second member, the locking element moving between an engaged position wherein the locking element holds or transfers torque between the first and second members, and a disengaged position wherein the locking element holds or transfers no torque between the first and second members. The locking element has a socket. The assembly includes a reciprocating member located in the socket when the locking element is in the disengaged position and spaced from the socket when the locking element is in the engaged position.

Further areas of applicability of the present invention will become apparent from the detailed description provided hereinafter. While indicating the preferred embodiment of the invention, the detailed description and specific examples are intended for illustration only and are not intended to limit the scope of the invention.

BRIEF DESCRIPTION OF THE DRAWINGS

The present invention will become more fully understood from the detailed description and the accompanying drawings, wherein:

FIG. 2 is a partial, schematic, cross-sectional view of the clutch assembly of FIG. 1 with the locking assembly in a disengaged position.

FIG. 3 is a partial, schematic, cross-sectional view of the clutch assembly of FIG. 1 with the locking assembly in an intermediate position after having moved from the disengaged position towards the engaged position.

FIG. 4 is a partial, schematic, cross-sectional view of the clutch assembly of FIG. 1 with the locking assembly in an engaged position.

DETAILED DESCRIPTION OF THE PREFERRED EMBODIMENTS

The following description of the preferred embodiment(s) is merely exemplary in nature and is in no way intended to limit the invention, its application, or uses.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or to show details of components. Specific structural and functional details disclosed herein are not to be interpreted as limiting but merely as a representative basis for teaching one skilled in the art to variously employ the present invention.

Figure 1:
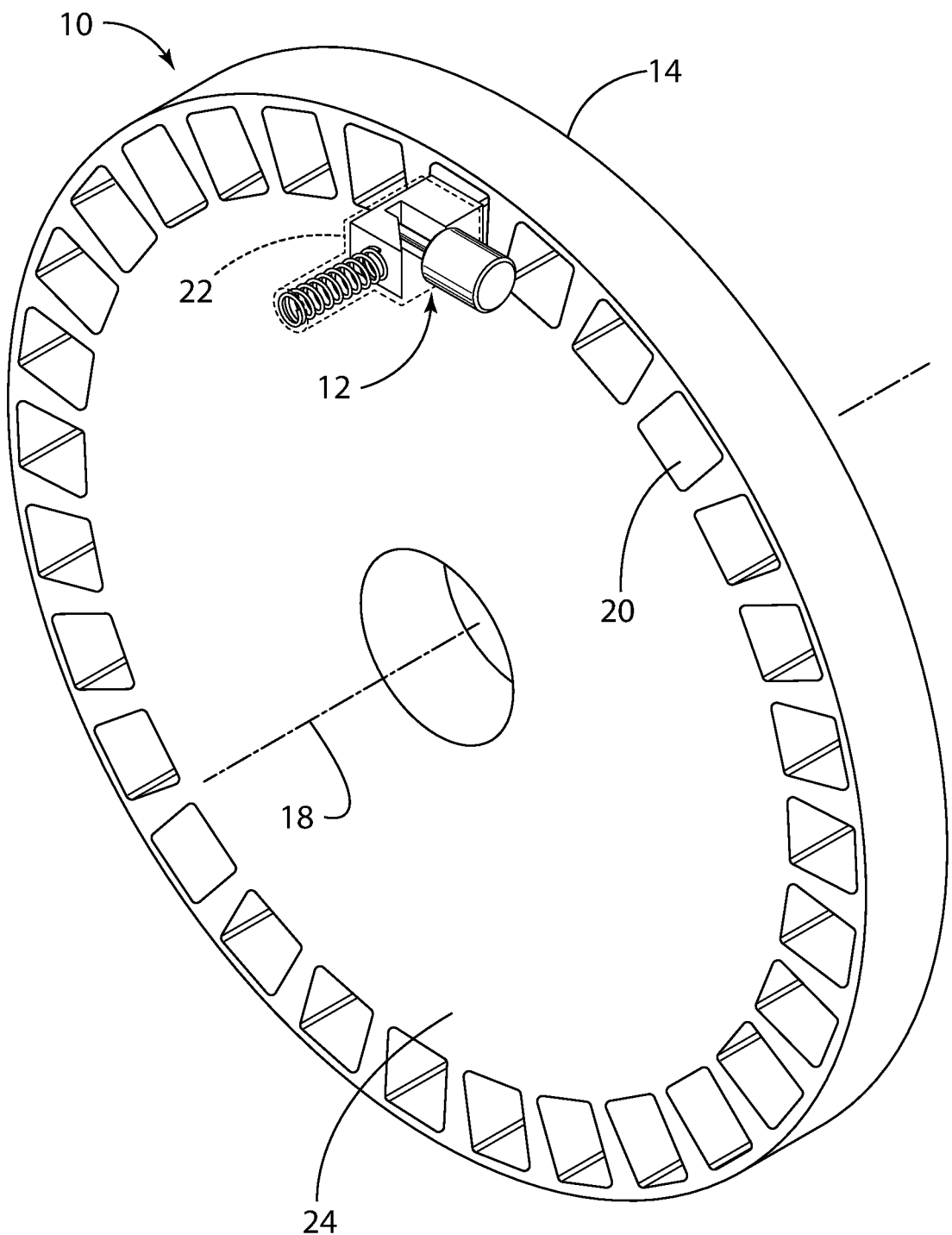
FIG. 1 is a perspective view of a clutch assembly having a locking assembly and a rotatable member.

FIG. 1 illustrates a clutch assembly 10 having a locking assembly, generally seen at 12. The clutch assembly 10 includes a first member 14 and a second member 16, shown in FIGS. 2-7. The locking assembly 12 connects or couples the first and second members 14, 16 to each other and decouples the first and second members 14, 16 from each other.

In one embodiment, the first member 14 is rotatable, rotating about a rotation axis 18, and the second member 16 is a stationary member. The locking assembly 12 connects or couples the first member 14 to the second member 16. The second member 16, may have a general form, e.g., a circular form, like the first member 14. The second member 16 may be a stationary locking plate or another fixed component. As shown in FIG. 1, the locking assembly 12 is typically located adjacent to a portion of first member 14, for example, a side or face 24. The first member 14 and second member 16 may be mounted for rotation relative to one another about a rotational axis. The locking assembly 12 may also connect or couple the first and second members 14, 16 when both are rotatable members rotating about a rotational axis. The term "couple" refers to connecting, fastening, or linking structures or mechanisms together.

A "clutch," which may be referred to as coupling or brake, establishes and disestablishes power flow paths from a power source to an output. A clutch connects one element to another and may be referred to as a brake when it connects or ties an element to ground. "Ground" refers to a stationary or fixed member, for example, a transmission case. The term "brake" further refers to a clutch wherein one of the members is drivably connected to a torque delivery element, and the other member is anchored and held stationary to a housing or tied to ground. The terms "coupling," "clutch," and "brake" may be used interchangeably. The term "transfer" when referring to the term "torque" refers to transmitting or causing torque to pass from one structure or mechanism to another, including transmitting or causing torque to pass to a stationary member or ground; for example, from the first member 14 to the second member 16.

Each of the first or rotatable member 14 and the second or stationary member 16 have a side or face 24, 26. The sides or faces 24, 26 are face towards each other.

In one embodiment, the first or rotatable member 14 may be a notch plate. The face 24 of the first or rotatable member 14 includes angularly spaced locking structures or features, for example, notches 20. The second or stationary member 16 may be a pocket plate. The second or stationary member 16 includes a receiving area, for example, a cavity or pocket 22 that extends to the face 26 of the second or stationary member 16.

FIGS. 2-6 show a cam-actuated locking assembly 28 is housed within the receiving area or pocket 22 of the second or stationary member 16. The cam-actuated locking assembly 28 includes a locking element 30. The locking element 30 moves linearly between a non-deployed or disengaged position and a deployed or engaged position. In the deployed or engaged position, the cam-actuated locking assembly 28 couples the first or rotatable member 14 to the second or stationary member 16 to prevent the first or rotatable member 14 from rotating and provide a torque path between the first or rotatable and the second or stationary members 14, 16. In this case, the locking element 30 of the cam-actuated locking assembly 28 engages a locking structure or notch 20 of the first or rotatable member 14 to couple the first or rotatable and second or stationary members 14, 16 together, wherein the locking element holds or transfers torque between the first and second members 14, 16.

Conversely, in the non-deployed or disengaged position, the cam-actuated locking assembly 28 decouples the first or rotatable member 14 from the second or stationary member 16, allowing the first or rotatable member 14 to move independently of the second or stationary member 16, with no torque path between the first or rotatable member 14 and second or stationary member 16. In this case, the locking element 30 of the cam-actuated locking assembly 28 is spaced from, not engaged to, any locking structure or notch 20 of the first or rotatable member 14, and the first and second members 14, 16 are decoupled wherein locking element 30 neither holds nor transfers torque between the first and second members 14, 16.

FIG. 2 depicts the locking element 30 in the disengaged position, FIG. 3 depicts the locking element 30 in an intermediate position after moving from the disengaged position towards the engaged position, and FIG. 4 depicts the locking element 30 in the engaged position.

The cam-actuated locking assembly 28 includes a spring 32. The spring 32 may be a compression spring positioned in a bore 34, located at an inner end or surface 36 of the pocket 22. The spring 32 extends between the locking element 30 and the pocket 22 of second or stationary member 16. The spring 32 urges the locking element 30 out of the pocket 22, past the face 26 of the second or stationary member 16, and toward the engaged position.

The cam-actuated locking assembly 28 includes an actuator sub-assembly 38, including an actuator, for example, a solenoid or motor 40. The actuator sub-assembly 38 may include a reciprocating member, for example a plunger 42 movable between a retracted position and an extended position. Energizing solenoid or motor 40 in a first manner causes the plunger 42 to move to the retracted position, and energizing the solenoid or motor 40 in a second or opposite manner causes the plunger 42 to move to the extended position.

The plunger 42 interacts with the locking element 30 to hold the locking element 30 in the disengaged position, as shown in FIG. 2. The plunger 42 holds the locking element 30 in the disengaged position preventing the force from spring 32 from moving the locking element 30 to the engaged position. When a shock load is administered while locking element 30 is in the disengaged position, the locking element 30 remains stationary and unable to engage because the plunger 42 interacts with the locking element 30 to hold the locking element 30 in the disengaged position. Consequently, locking element 30 does not unintentionally deploy during shock load events.

When the plunger 42 ceases interaction with the locking element 30, it no longer holds the locking element 30 in the disengaged position. FIG. 3 shows when the locking element 30 is no longer held in the disengaged position, the force of the spring 32 moves the locking element 30 in the direction of the arrow 50 to the engaged position shown in FIG. 4.

The locking element 30, which may be a locking lug, has a cam surface or cam profile 44 and a box-like entrapment section, socket, or seat 46, including a wall or shoulder 48. Interaction of plunger 42 with locking element 30 entails interaction between the plunger 42, the cam profile 44, and the socket or seat 46. When the locking element 30 is in the disengaged position shown in FIG. 2, the plunger 42 is in the extended position and extends into the socket or seat 46. Unintended engagement of locking element 30, the locking element 30 moving from the disengaged position to the engaged position, is prevented as the plunger 42 extends into the socket or seat 46 of the locking element 30.

Activating the solenoid or motor 40 moves locking element 30, in the direction of the arrow 54, from the disengaged position to the engaged position, sequentially depicted in FIGS. 2-3. Activating the solenoid or motor 40 moves the plunger 42 from the extended position to the retracted position. FIG. 3 shows that retracting the plunger 42 removes the plunger 42 from the socket or seat 46 of the locking element 30. As the plunger 42 retracts, it moves toward the motor 40 in the direction of arrow 54. The plunger 42 clears the socket or seat 46, moves past the wall or shoulder 48, wherein the end 42a of the plunger travels on or along the cam profile 44 as the force of the spring 32 acting on locking element 30 moves the locking element 30 outward, in the direction of the arrow 50, until the locking element 30 extends out of the pocket 22 and past the face 26 of the second or stationary member 16; from the disengaged position toward the engaged position. FIG. 4 shows the locking element 30 in the engaged position, wherein the locking element 30 extends out of the pocket 22 of the second or stationary member 16 and engages a locking structure or notch 20 of the first or rotatable member 14. Engagement of locking element 30 with locking structure or notch 20 couples the first or rotatable member 14 and second or stationary member 16 together.

Figure 5:
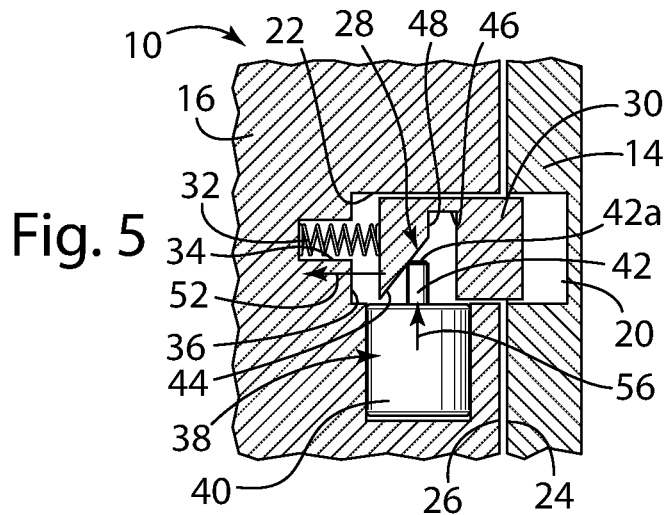
FIG. 5 is a partial, schematic, cross-sectional view of the clutch assembly of FIG. 1 with the locking assembly in an intermediate position after moving from the engaged position towards the disengaged position.
Figure 6:
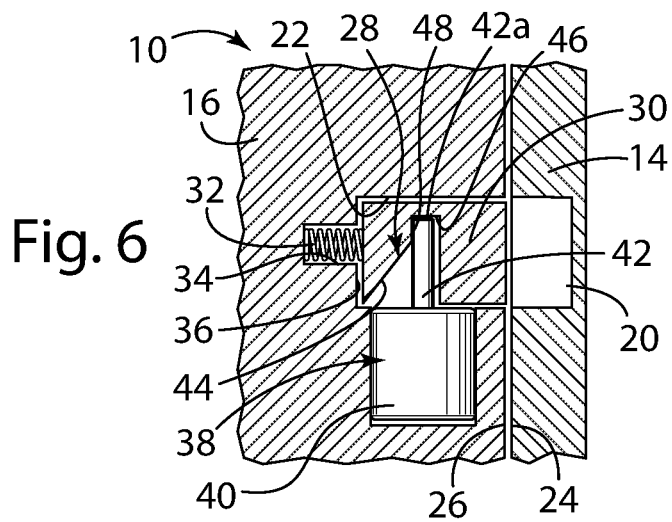
FIG. 6 is a partial, schematic, cross-sectional view of the clutch assembly of FIG. 1 with the locking assembly in a disengaged position.

FIG. 5 depicts the locking element 30 in the intermediate position after moving, in the direction of arrow 52, from the engaged position towards the disengaged position, and FIG. 6 depicts the locking element 30 in the disengaged position.

Activating the solenoid or motor 40 moves the plunger 42 in the direction of arrow 56 from the retracted position to the extended position, and correspondingly, the locking element 30 from the engaged position, shown in FIG. 4, to the disengaged position, shown in FIG. 6. When the plunger 42 moves in the direction of arrow 56 from the retracted position to the extended position, the plunger 42 interacts with the cam profile 44 of the locking element 30. Based on the geometry of cam profile 44, as the plunger 42 moves to the extended position, the interaction of plunger 42 with the cam profile 44 causes the locking element 30 to move linearly from the previously engaged locking structure or notch 20 of the first or rotatable member 14 in the direction of the arrow 52 back to the disengaged position. FIG. 6 shows, in the disengaged position, the interaction of plunger 42 with cam profile 44 culminates with the end 42a of the plunger 42 being inserted into the socket or seat 46 of locking element 30. Inserting the end 42a of the plunger 42 into the socket or seat 46 secures the locking element 30 in the disengaged position. In the disengaged position, locking element 30 does not extend out from or past the face 26 of the second or stationary member 16, nor does the locking element 30 engage any locking structure or notch 20 of the first or rotatable member 14, whereby the first and second members 14 and 16 are disengaged from each other.

In one embodiment, the first member 14, can be a notch plate, and the second member can be a pocket plate. The cam-actuated locking assembly 28 is housed within a receiving area or pocket 22 of the second member 16.

The cam-actuated locking assembly 28 includes a locking element 30. The locking element 30 moves linearly between a deployed position; i.e., engaged position, coupling position, or "ON" position, in which the locking element 30 extends out or past a face 26 from the second member 16 and engages a locking structure or notch 20 of the first member 14 to thereby couple the first and second members 14, 16 together; and a non-deployed position; i.e., disengaged position, uncoupling position, or "OFF" position, in which the locking element 30 does not extend out from or past a face 26 the second member 16 and does not engage any locking structure or notches of the first member 14 whereby the first and second members 14, 16 are disengaged from each other.

The cam-actuated locking assembly 28 further includes a spring 32. The spring 32 is positioned between the locking element 30 and an inner end or surface 36 of the pocket 22 of the second member 16. The spring 32 urges or pushes the locking element 30 towards the engaged position.

The cam-actuated locking assembly 28 also includes an actuator, for example, a plunger 42. The plunger 42 interacts with the locking element 30 to secure the locking element 30 in the disengaged position, thereby preventing the force from the spring 32 from moving the locking element 30 to the engaged position; and ceasing interaction with the locking element 30 to unlock the locking element 30 from the disengaged position, thereby allowing the force from the spring 32 to move the locking element 30 to the engaged position.

Thus, when a shock load is administered while the locking element 30 is in the disengaged position, the locking element 30 remains stationary and unable to engage. The locking element 30 remains stationary and unable to engage because the plunger 42 interacts with the locking element 30 to secure the locking element 30 in the disengaged position. Consequently, the locking element 30 does not unintentionally deploy during shock load events.

The plunger 42 moves between an extended and a retracted position. In the extended position, the plunger 42 interacts with the locking element 30 to secure the locking element 30 in the disengaged position. In the retracted position, the plunger 42 ceases interaction with the locking element 30, whereby the force of the spring 32 moves the locking element 30 from the disengaged position to the engaged position.

In one embodiment, the cam-actuated locking assembly 28 includes an actuator sub-assembly 38, an actuator, for example, a solenoid or motor 40, and the plunger 42. In the present example, the solenoid or motor 40 moves the plunger 42 between the extended and the retracted positions. Other actuators or movement mechanisms can move the plunger 42, such as electromotive, pneumatic, or hydraulic. In one example, energizing the solenoid or motor 40 in a first manner causes the plunger 42 to move to the retracted position, and energizing the solenoid or motor 40 in an opposite second manner causes the plunger 42 to move to the extended position.

The cam-actuated locking assembly 28 may also include a spring assembly or other force mechanism configured to apply a force moving or urging the plunger 42 towards one of the extended or retracted positions. In these embodiments, the movement mechanism may only move the plunger 42 towards one of the positions, while a spring assembly or other force mechanism moves or urges the plunger 42 towards the other position. In these embodiments, the movement mechanism may only move the plunger 42 in one direction.

The locking element 30, which may be a locking lug, post, or arm, includes a cam profile 44 and a box-like socket or seat 46. Interaction of the plunger 42 with the locking element 30 entails the interaction of an end 42a of the plunger 42 with the cam profile 44 and the socket or seat 46. Particularly when the locking element 30 is in the disengaged position. The plunger 42 may have a rectangular or cylindrical-shaped end, which in its extended position extends into the socket or seat 46. Engagement of the locking element 30, i.e., moving the locking element 30 from the disengaged position to the engaged position under g-load/vibration, for example, under a shock load, is prevented as the extended plunger 42 remains in the socket or seat 46 of the locking element 30.

To move the locking element 30 from the disengaged position to the engaged position, the movement mechanism, for example, the solenoid or motor 40, is activated to move the plunger 42 from the extended position to the retracted position. The plunger 42 thereby retracts and is removed from the socket or seat 46 of the locking element 30. With the plunger 42 removed from the socket or seat 46, the force of the spring 32 acting on the locking element 30 causes the locking element 30 to move from the disengaged position toward the engaged position. In the engaged position, the locking element 30 extends out from or past the face 26 of the second member 16 and engages a locking structure or notch 20 of the first member 14.

To move the locking element 30 from the engaged position to the disengaged position, the movement mechanism, for example, solenoid or motor 40, moves plunger 42 from the retracted position to the extended position. As the plunger 42 moves from the retracted position to the extended position, the plunger 42 interacts with the cam profile 44. Based on the geometry of the cam profile 44, the interaction of the plunger 42 with the cam profile 44 as the plunger 42 moves to the extended position causes the locking element 30 to move from the previously engaged locking structure or notch 20 of the first member 14 and back to the disengaged position. Upon the locking element 30 being in the disengaged position, the interaction of the plunger 42 with the cam profile 44 culminates in the plunger 42 being inserted into the socket or seat 46 of the locking element 30. The locking element 30 is secured in the disengaged position due to the plunger 42 inserted into the socket or seat 46.

The cam-actuated locking assembly 28, which may also be referred to as the cam-actuated single strut insert ("SSI"); the cam locking SSI; or the cam-actuated single locking element, is a locking element actuation assembly having aspects for preventing unintended locking element engagement. The cam profile 44 and socket or seat 46 of the locking element 30 and the plunger 42 of the actuator sub-assembly 38 function together to prevent unintended engagement of the locking element 30.

In one example, the first member 14 is rotatable, and the second member 16 is stationary. In this case, when the locking element 30 is in the engaged position and the first and second members 14, 16 are coupled, preventing rotary motion of the first member 14 as the second member 16 is grounded or stationary. Conversely, in this case, when the locking element 30 is in the disengaged position and the first and second members 14, 16 are decoupled, wherein the first member 14 may rotate independently of the second or stationary member 16.

In another embodiment, the first and second members 14, 16 are rotatable. In this case, when the locking element 30 is in the engaged position and the first and second members 14, 16 are coupled together, the first and second members 14, 16 may rotate together as a unit. Conversely, in this case, when the locking element 30 is in the disengaged position and the first and second members 14, 16 are decoupled from one another, each of the first and second members 14, 16 may rotate independently of the other member.

Figure 7:
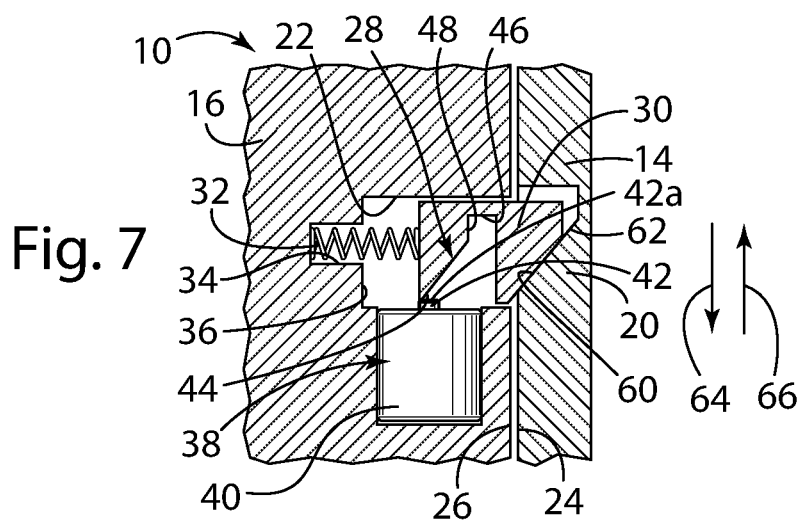
FIG. 7 is a partial, cross-sectional view of a clutch assembly according to a further embodiment with the locking assembly engaged.

FIG. 7 shows a further embodiment wherein the locking element 30 has a tapered or inclined end or surface 60. The tapered or inclined end or surface 60 of the locking element 30 provides an overrun function when the locking element 30 engages a corresponding tapered or inclined surface 62 of the locking structure or notch 20 of the rotatable member 14. As illustrated, the locking element 30 prevents rotation of the rotatable member 14 in a first direction shown by arrow 64, e.g., clockwise, while allowing rotation of rotatable member 14 in an opposite, second direction shown by arrow 66, e.g., counterclockwise. In contrast to the end portion of locking element 30 not being tapered, wherein locking element 30 prevents the relative movement between the first and second members 14, 16 in both the first and second directions, shown by arrows 64, 66.

While exemplary embodiments are described above, it is not intended that these embodiments describe all possible forms of the present invention. Rather, the words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature. Thus, variations that do not depart from the gist of the invention are intended to be within the scope of the invention. Such variations are not to be regarded as a departure from the spirit and scope of the invention.

What is claimed is:

1. A clutch assembly comprising:
a first member having a locking structure;
a second member having a receiving area;
a locking element supported in the receiving area of the second member, the locking element moving between an engaged position wherein the locking element transfers torque between the first and second members and a disengaged position wherein the locking element transfers no torque between the first and second members, the locking element including a socket;
a reciprocating member, the reciprocating member located in the socket when the locking element is in the disengaged position and the reciprocating member spaced from the socket when the locking element is in the engaged position;
the locking structure of the first member includes at least one notch; and
the receiving area of the second member includes at least one pocket, with the locking element disposed in the pocket.

2. The clutch assembly of claim 1 including a spring acting on the locking element to urge the locking element towards the engaged position.

3. The clutch assembly of claim 1 wherein the locking element includes a cam profile.

4. The clutch assembly of claim 3 wherein the reciprocating member includes a plunger moving between a retracted position and an extended position, an end of the plunger contacting the cam profile wherein movement of the plunger moves the locking element.

5. The clutch assembly of claim 4 wherein when the plunger is in the extended position, the end of the plunger is in the socket.

6. The clutch assembly of claim 5 including an actuator moving the plunger between the retracted position and the extended position.

7. The clutch assembly of claim 1 including a spring acting on the locking element to urge the locking element towards the engaged position;
the reciprocating member includes a plunger moving between a retracted position and an extended position, the plunger contacting a cam profile of the locking element wherein movement of the plunger moves the locking element; and
an actuator moves the plunger between the retracted position and the extended position.

8. The clutch assembly of claim 1 including:
the locking element having a ramp surface wherein the ramp surface is disposed in the locking structure when the locking element is in the engaged position.

9. The clutch assembly of claim 1 including:
the locking element having a ramp surface; and
the notch having a complementary ramp surface wherein the respective ramp surfaces are adjacent when the locking element is disposed in the locking structure.

10. A clutch assembly comprising:
a first member;
a second member;
a cam-actuated locking assembly housed within a receiving area of the second member and including a locking element movable between an engaged position in which the locking element extends out from the second member and engages a locking structure of the first member and a disengaged position in which the locking element does not extend out from the second member and does not engage the locking structure of the first member, a plunger movable between a retracted position and an extended position, and a spring arranged to bias the locking element towards the engaged position;

the plunger in the extended position engages the locking element to lock the locking element in the disengaged position, whereby the locking element remains in the disengaged position while the clutch assembly experiences a shock load event;

the locking element has a cam profile and an entrapment section separate from the cam profile; and the plunger spaced from the entrapment section when the locking element is in the engaged position;

the locking element having a ramp surface; and the locking structure having a complementary ramp surface wherein the respective ramp surfaces are adjacent when the locking element is disposed in the locking structure.

11. The clutch assembly of claim 10 wherein:

the plunger moves from the extended position to the retracted position to disengage from the locking element and unlock the locking element from the disengaged position, whereby biasing of the spring causes the locking element to move from the disengaged position to the engaged position.

12. The clutch assembly of claim 10 wherein:

the plunger is moved from the retracted position to the extended position and interacts with the locking element as the plunger moves to the extended position to cause the locking element to move from the engaged position to the disengaged position.

13. The clutch assembly of claim 10 wherein:

the cam profile and the entrapment section are adjacent to one another.

14. The clutch assembly of claim 13 wherein:

the plunger is moved from the extended position to the retracted position to be removed from the entrapment section of the locking element to unlock the locking element from the disengaged position, whereby biasing of the spring causes the locking element to move from the disengaged position to the engaged position.

15. The clutch assembly of claim 14 wherein:

the plunger moves from the retracted position to the extended position and interacts with the cam profile of the locking element as the plunger moves to the extended position and the interaction of the plunger with the cam profile as the plunger moves towards the extended position causes the locking element to move from the engaged position to the disengaged position.

16. The clutch assembly of claim 10 wherein:

the cam-actuated locking assembly further includes an actuator moving the plunger between the retracted position and the extended position; and the actuator includes a solenoid.

17. The clutch assembly of claim 10 wherein:

the first member is a pocket plate; and the second member is a notch plate.

18. A clutch assembly comprising:

a first member having a locking structure;

a second member having a receiving area;

a locking element supported in the receiving area of the second member, the locking element moving between an engaged position wherein the locking element transfers torque between the first and second members and a disengaged position wherein the locking element transfers no torque between the first and second members, the locking element including a cam profile and a seat, the seat separate from the cam profile; and a reciprocating member, the reciprocating member contacts the cam profile when the locking element is in the engaged position and contacts the seat when the locking element is in the disengaged position.

19. The clutch assembly of claim 18 including:

the locking element having a ramp surface wherein the ramp surface is disposed in the locking structure when the locking element is in the engaged position.

20. The clutch assembly of claim 18 including:

the locking element having a ramp surface; and the locking structure having a complementary ramp surface wherein the respective ramp surfaces are adjacent when the locking element is disposed in the locking structure.

* * * * *